US008817239B2

(12) United States Patent
Nau (10) Patent No.: US 8,817,239 B2
(45) Date of Patent: Aug. 26, 2014

(54) DISTANCE BASED POSITION SENSING

(75) Inventor: Kevin R. Nau, New Carlisle, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 247 days.

(21) Appl. No.: 13/482,130

(22) Filed: May 29, 2012

(65) Prior Publication Data

US 2013/0003037 A1 Jan. 3, 2013

Related U.S. Application Data

(60) Provisional application No. 61/503,791, filed on Jul. 1, 2011.

(51) Int. Cl.
*G01S 17/87* (2006.01)
*G01S 7/499* (2006.01)

(52) U.S. Cl.
CPC ............... *G01S 17/875* (2013.01); *G01S 7/499* (2013.01)
USPC ........... 356/3.01; 356/3.1; 356/4.01; 356/4.1; 356/5.01

(58) Field of Classification Search
CPC ...... G01C 15/00; G01C 15/002; G01C 15/02; G01C 2013/466–2013/468

USPC ............. 356/3.01–3.15, 4.01–4.1, 5.01–5.15, 356/6–22, 28, 28.5, 139.01–139.1

See application file for complete search history.

(56) References Cited

U.S. PATENT DOCUMENTS

| 4,413,907 | A | * | 11/1983 | Lane | 356/139.05 |
| 5,137,354 | A | * | 8/1992 | deVos et al. | 356/141.3 |
| 6,108,076 | A | * | 8/2000 | Hanseder | 356/141.1 |
| 6,734,952 | B2 | | 5/2004 | Geser et al. | |
| 2011/0080477 | A1 | | 4/2011 | Trenary et al. | |

\* cited by examiner

*Primary Examiner* — Luke Ratcliffe
(74) *Attorney, Agent, or Firm* — Kraguljac Law Group, LLC (57) ABSTRACT

Systems, methods, and other embodiments associated with distance based position measurement are described. In one embodiment, an apparatus is configured to be positioned proximate a feature of interest. The apparatus includes a laser distance meter (LDM) configured to emit a laser beam and to determine first and second distances between the LDM and first and second targets. The first and second targets have known positions in three dimensions with respect to a reference plane from which the LDM is located. The apparatus also includes a trilateration unit configured to compute a two dimensional position of the LDM relative to the targets based, at least in part, on the first and second distances.

21 Claims, 8 Drawing Sheets

DISTANCE BASED POSITION SENSING

CROSS REFERENCE TO RELATED APPLICATIONS

The present disclosure claims the benefit of U.S. Provisional Patent Application 61/503,791, filed Jul. 1, 2011, which is wholly incorporated herein by reference.

BACKGROUND

During construction of a building, interior construction layouts are created that map the actual position of various building features like plumbing, electrical, and HVAC sleeves. The interior construction layouts are used to plan subsequent construction activities so that any deviation between the planned and actual positions of the building features does not adversely affect subsequent construction activities. For example, if a plumbing sleeve is located slightly out of position (with respect to an initial blueprint) in a poured concrete floor, a pipe routed through a preassembled wall will not align properly with the sleeve, necessitating expensive reworking of the floor, the wall, or both. The preassembled wall can be constructed using an interior construction layout that identifies the "true" location of the plumbing sleeve so that when the wall arrives at the site the pipe will align with the sleeve. Creating the interior construction layout is time consuming, typically requiring two people to operate surveying equipment that assists with the measurements.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Some existing position measurement systems utilize laser distance meters (LDMs) that can be positioned on or near a construction feature of interest (e.g., a plumbing sleeve in a poured concrete floor). An LDM typically includes a laser source such as a laser diode and light collection optics. The light collection optics sense light from the laser source reflecting back to the LDM from a feature of interest. The LDM determines the distance between the LDM and the feature of interest based on a property of the reflected light. Phase lag time and time of flight are two methods used by LDMs to determine the distance based on the reflected light. In use, the LDMs measure the distance between the selected construction feature and several locations on reference features like walls. To determine a two dimensional position of the construction feature relative to the reference features, an angle measurement is made using an angle sensor. The angle measurement is combined with the distances to derive a two dimensional position of the LDM using a technique called "triangulation".

Some position measurement systems utilize targets that are located on construction features and used by the LDMs and angle sensors to determine distances and angles. The systems may include horizontal and vertical angle sensors and automatic tracking servo systems that lock the LDM's laser onto the targets when the target is moved to a new feature of interest. Because the level reference for the vertical angle of the laser beam from the LDM impacts the measurements used in triangulation, the systems may also include leveling servos. These angle sensors, level sensors, and tracking servo systems are delicate, complicated, and expensive. Two or more operators are often needed to operate the position measurement systems due to their complexity.

Figure 1:
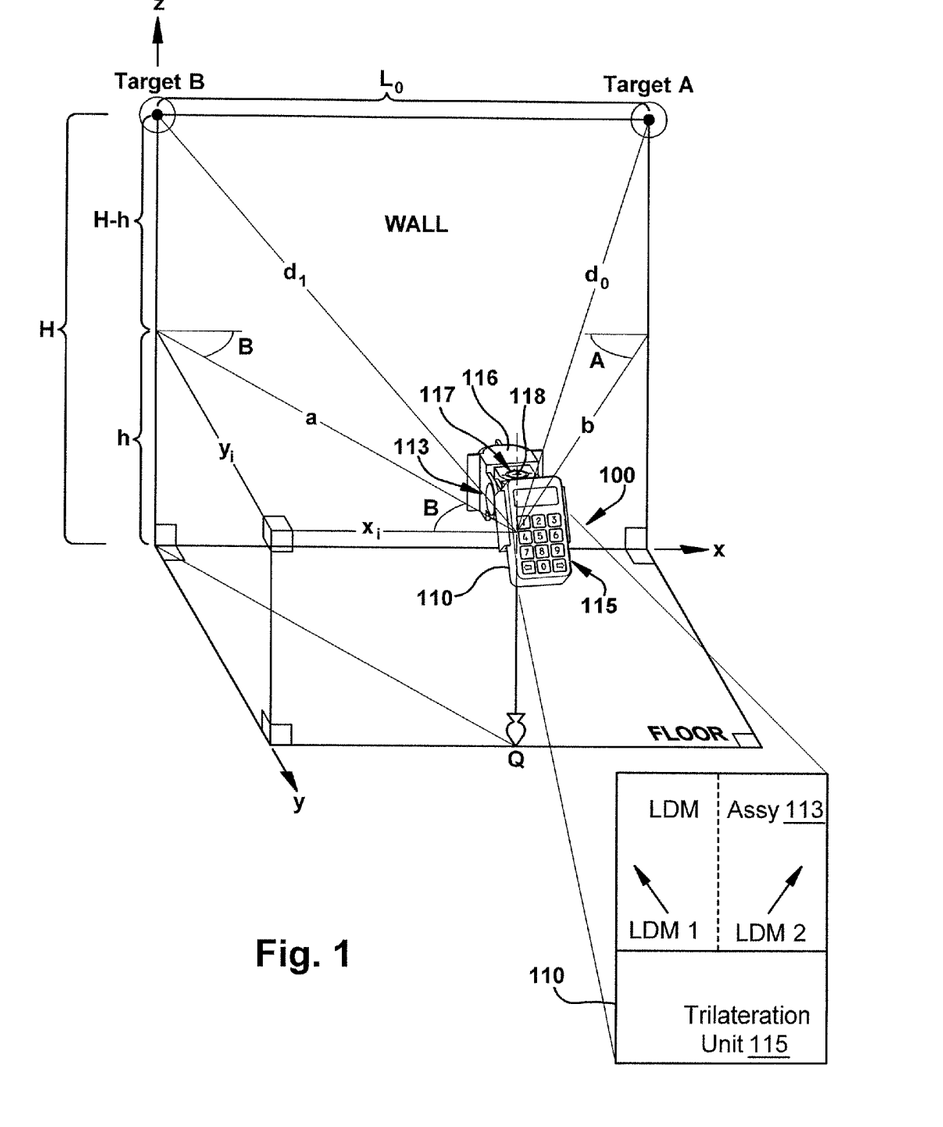
FIG. 1 is a schematic illustration of an example embodiment of a distance based measuring system.

FIG. 1 is a schematic illustration of an example embodiment of a distance based measurement system 100 in operation at a construction site. The distance based measurement system 100 includes a position calculation unit (PCU) 110. The PCU 110, can be hand held, adapted to be set on a horizontal surface, or mounted on a tripod, bipod or pole, or a wheeled carriage. The PCU 110 includes an LDM assembly 113 that houses one or more LDMs. As will be described in more detail below, some embodiments of the LDM assembly 113 include a single LDM that emits a scanning thin divergent beam (FIG. 3) or a wide static divergent beam (FIG. 3A). Other embodiments include multiple LDMs (FIG. 4) that each emit divergent beams that cover a relatively large area. A plummet is shown hanging from the PCU 110 to indicate that the PCU 110 is aligned with respect to a feature of interest Q along a line of sight that is approximately normal to the FLOOR.

The PCU 110, is capable of being moved relative to a reference plane (e.g., FLOOR in FIG. 1) so that it may be positioned proximate a feature of interest Q. For the purposes of this description the surface labeled FLOOR (which may or may not be "level") will be used as the reference plane for position calculations. Two targets A and B have been affixed to the WALL. The targets A and B are located on the WALL at a known height H relative to the FLOOR and at a known distance $L_0$ away from one another. The distances $L_0$ and H, as well as "h" (the height of the PCU) can be measured, possibly by the PCU itself, during a set up procedure. The PCU 110 is positioned proximate the feature of interest Q located on the FLOOR. As will be described in more detail with respect to FIG. 1A, the PCU 110 may include a level bubble, optical sight, or plummet to aid in aligning the LDM assembly 113 to the feature of interest Q. The LDM assembly 113 measures a first distance $d_0$ between itself and target A and a second distance $d_1$ between itself and target B.

The PCU 110 includes a trilateration unit 115 that inputs the first and second distances and calculates the position of the LDM. Given a reference plane (e.g., FLOOR), a 2 dimensional position $(x_i, y_i)$ of Q can be derived using only the first and second distances as follows:
where:
$d_0$=the first distance;
$d_1$=the second distance;
$L_0$=distance between the targets;
h=the height of the PCU; and
H=the height of the first and second targets relative to the reference plane.
$L_0$, H and h are known.
From trigonometry:

$$X_i = a \cos B \qquad (1)$$

From the Pythagorean Theorem:

$$a^2 = d_1^2 - (H-h)^2 \qquad (2)$$

$$b^2 = d_0^2 - (H-h)^2 \qquad (3)$$

$$y_i = \sqrt{a^2 - x_i^2} \qquad (4)$$

From the Law of Cosines $$B = \cos^{-1}\left(\frac{a^2 + L_0^2 - b^2}{2aL_0}\right) \qquad (5)$$

Substituting (5) into (1) and reducing yields:

$$x_i = \frac{a^2 + L_0^2 - b^2}{2L_0} \qquad (6)$$

Substituting (2) and (3) into (6) and reducing yields:

$$x_i = \frac{d_1^2 + L_0^2 - d_0^2}{2L_0} \qquad (7)$$

Substituting (2) into (4) yields $$y_i = \sqrt{d_1^2 - (H-h)^2 - x_i^2} \qquad (8)$$

Equations (7) and (8) are used by the trilateration unit 115 to determine the two dimensional position $(x_i, y_i)$ of the feature of interest Q. Note that the trilateration unit 115 determines the two dimensional position based solely on linear distances between the targets, the LDM, and the FLOOR. No angles were measured and thus no angle sensors are needed. The system 100 does not rely on tracing servos, leveling equipment or radio links between the LDM and targets. This simplified distance based, or "trilateration", approach is possible because a reference plane (the FLOOR) is used in the calculations. Since most, if not all, buildings include planar floors, the distance based measurement system 100 has wide applicability and greatly simplifies the process of mapping construction features.

It can be seen from Equation (8) that if the PCU 110 is held at nearly the same height above the floor as the targets (i.e., h≈H) and $d_1$ and $x_i$ are comparatively large, small deviations in the height of the PCU would cause negligible errors to the $y_i$ position, thus allowing the PCU to be hand held without incurring significant error in the calculated position.

A single operator can position the targets A and B and then position the PCU 110 at various construction features in a site to determine the position of construction features. A divergent laser beam, as opposed to a collimated beam, is emitted by the LDM assembly 113 to facilitate acquiring measurements $d_0$ and $d_1$ from the targets, as will be described in more detail below. For the purposes of this description, targets will be positioned on walls and features of interest will be located on the FLOOR. However, any arrangement of targets and features of interest relative to the PCU 110 that enables distance based position measurement can be used.

The origin of the Cartesian coordinate system shown in FIG. 1 was chosen for simplicity. The origin and resulting measurement coordinate system could be transformed to other locations (e.g., relative to a surveyor's reference stake) as desired. Likewise transformation from Cartesian to other type of coordinate systems (e.g., polar) could be employed as desired.

Figure 1A:
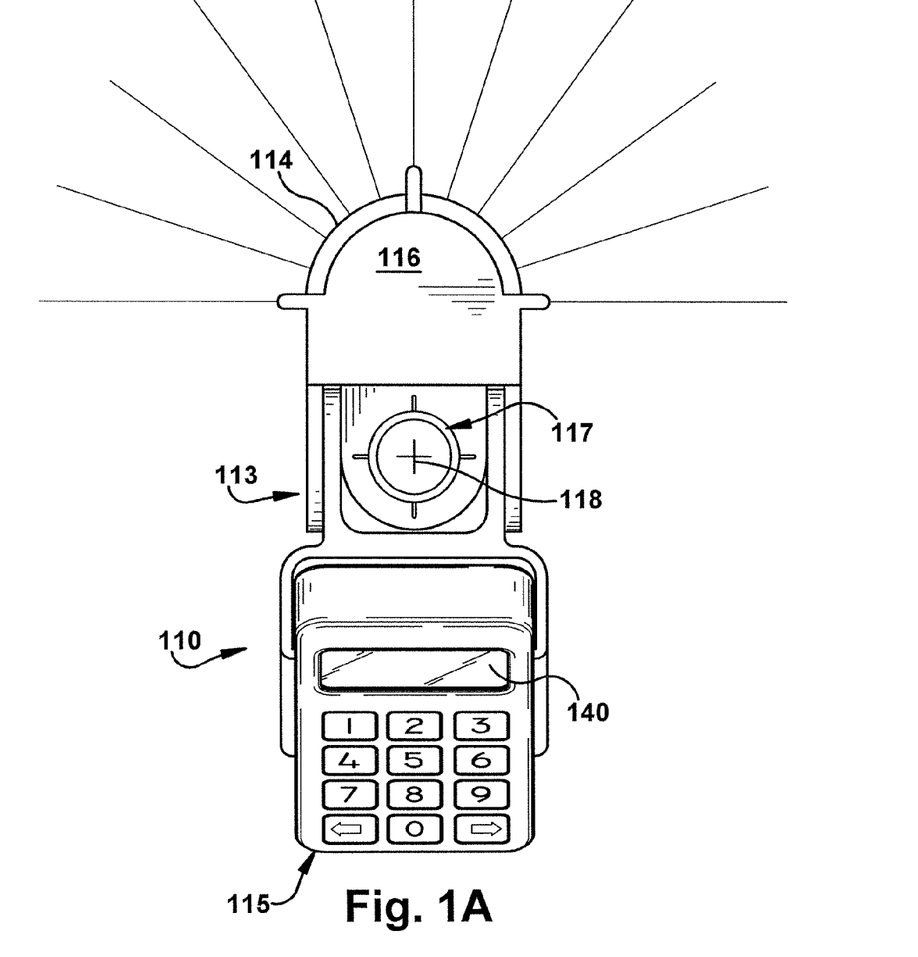
FIG. 1A is a top view of an example embodiment of a position calculation unit used in a distance based measuring system.

FIG. 1A illustrates one example embodiment of the PCU 110. The PCU 110 is sized to fit in hand and features a removable trilateration unit 115. The trilateration unit 115 includes circuitry (e.g., microprocessor) configured to calculate the position of the PCU 110 using trilateration. The trilateration unit 115 includes user interface features 140 (e.g., screen, buttons) for viewing and inputting location coordinates. Other types of user interface features such as, for example, numerical readouts, indicator lights, speakers, and so on may also be included the trilateration unit 115. In some embodiments, the trilateration unit 115 may not include user interface features and may instead be configured to transmit (e.g., wirelessly) position information to a separate user interface means (e.g., laptop).

The LDM assembly 113 includes an LDM 114 configured to emit a laser beam to determine the first and second distances. A pointer reference assembly 116 is attached around a top periphery of the LDM assembly 113 and provides a reference to help a user to properly orient the PCU 110 so that the laser emitted by the LDM 114 is aimed toward the targets.

The LDM assembly 113 also includes a sight 117 with a reticule 118. To align the PCU 110 with a feature of interest for position measuring, a user may orient the PCU 110 with the reference plane (a level may be used) and then hold the PCU 110 over the feature of interest so that it may be seen through the sight 117 and aligned with the reticule 118. For the purposes of position calculation, the cross hairs of the reticule 117 are taken to be the position of the LDM for the position calculations performed by the LDM 114 so that the LDM in fact calculates the distances between the targets and the reticule 117. In other embodiments, other alignment features may be used to aid a user in positioning the PCU 110 in proximity to the feature of interest. Other alignment features include a protrusion from the side of the PCU 110 that can be aligned over the feature of interest, or simply an opening through which the user may look to locate the feature of interest. The positional relationship between the alignment feature and the LDM 114 is accounted for in the distance calculations.

Figure 2:
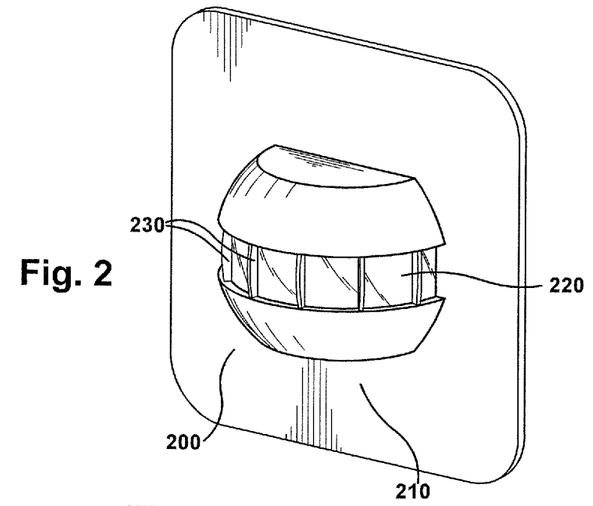
FIG. 2 is a perspective view of an example embodiment of a target that can be used with a distance based measuring system.

FIG. 2 illustrates an example embodiment of a passive reflective target 200 that is adapted for use with a divergent beam. The target 200 is a retro reflective, or corner cube array that includes a low reflectance plastic housing 210 that holds a half-cylindrical array of reflective corner cubes 220. The corner cubes within the array may be small to minimize their reflection offset and may be molded of plastic to minimize cost. When a divergent laser beam shines onto the target 200, the beam "overfills" the reflective corner cubes in its path, allowing an accurate measurement of the distance with minimal effort in aiming the LDM at the target.

Since the laser is divergent and not collimated, the retro reflector target may be designed to nearly collimate the reflected light at the maximum operating range. This directs more light energy back to the collection optics at longer ranges and defocuses the reflection at shorter ranges. The defocusing at shorter ranges may be helpful in getting the larger reflection into the possibly offset collection optics of the LDM.

The effective radius of the cylindrical array of reflective corner cubes is known and is taken into account in the position calculations. The reflected energy's incoming angle of incidence is also limited by the corner cube's design, thus limiting the potential "multipath" error from the corner cube array in the position calculation. If this inherent limitation of incidence angle still allows a significant error in position, the corner cube design could be modified or optional shutters 230 could be added between sections of the corner cube array to minimize the error.

Figure 2A:
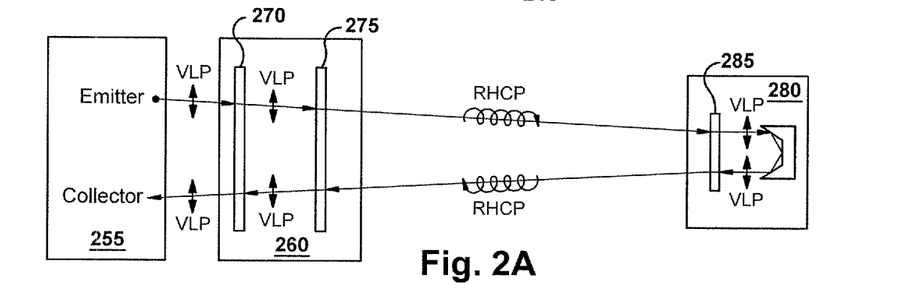
FIGS. 2A and 2B are schematic illustrations of a distance based measuring system that employs polarization to distinguish targets from other surfaces.
Figure 2B:
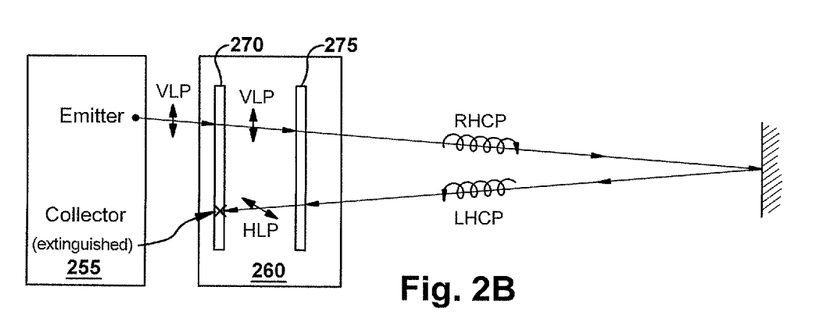

Targets may include features that help them to be distinguished from their surroundings and one another. FIGS. 2A and 2B illustrate one embodiment of a polarization filtering technique that distinguishes a desired target reflection (FIG. 2A) from an undesired (wall) reflection (FIG. 2B). This filtering technique could be added to any of the position measurement systems described herein. A circular polarizer 260 is positioned to act on the laser beam emitted and collected by a laser distance meter 255. The circular polarizer 260 includes a vertical linear polarizer 270 that is aligned to the emitted laser beam's linear polarization and produces vertical linear polarized light (VLP in FIGS. 2A and 2B). The circular polarizer 260 also includes a quarter wave retarder film 275 that acts on the VLP light from the vertical linear polarizer 270 to produce right hand circular polarized light (RHCP).

In FIG. 2A, the RHCP light from the LDM 255 is reflected back toward the LDM by a target corner cube 280 that is covered with a quarter wave retarder film 285. The film produces a reflected beam that maintains its right handed circular polarization. Thus the reflected beam passes back through the quarter wave retarder film 275 to produce VLP light which passes through the vertical linear polarizer 270 and is received by the collector of the LDM 255.

Referring now to FIG. 2B, when the beam reflects off other surfaces (e.g., wall in FIG. 2B), which lack the quarter wave retarder film, the reflected beam will have left hand circular polarization (LHCP). The reflected beam passes back through the quarter wave retarder film to produce horizontal linear polarized (HLP) light which is extinguished by the vertical linear polarizer 270 and is not received by the collector of the LDM 255. The vertical orientation of the emitted laser beam polarization was chosen to simply illustrate the example polarization filter of FIG. 2A. Other orientations of polarized light and/or filters could be used.

In other embodiments, frequency filters on the targets can be used to differentiate the targets from their surroundings. In other embodiments, the targets can be shuttered on and off to distinguish their reflection from a continuous reflection from surrounding objects. In some embodiments, a barcode that can be read by the PCU as the LDM beam sweeps across the target may be added to each target to distinguish the target from its surroundings and for target identification. The various filtering techniques described herein for distinguishing a target form its surroundings may also be adapted to distinguish one target from the other when necessary.

Figure 3:
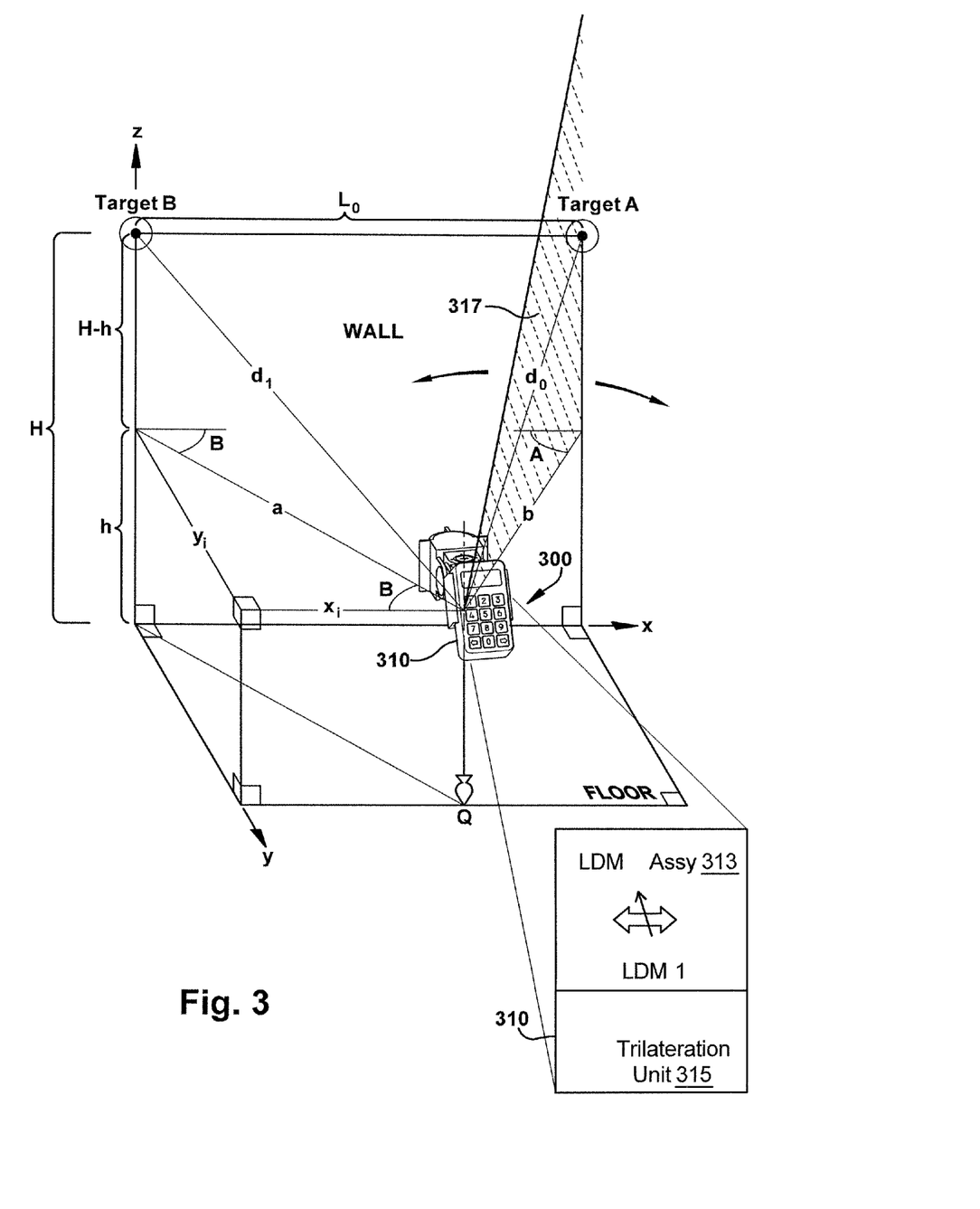
FIG. 3 is a schematic illustration of an example embodiment of a distance based measuring system that employs a thin scanning divergent laser beam.
Figure 3A:
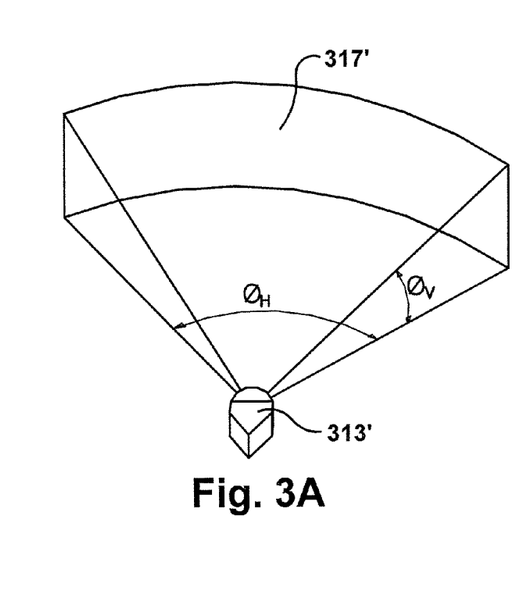
FIG. 3A is a schematic illustration of a wide static divergent laser beam that can be used in alternative to the thin scanning divergent laser beam of FIG. 3.

FIG. 3 is a schematic illustration of an example embodiment of a distance based measurement system 300 that provides a thin scanning divergent beam 317 to facilitate acquiring measurements $d_0$ and $d_1$ from the targets with a PCU 310. The divergent laser beam 317 is shown illuminating the target A. While the divergent beam 317 shown in FIG. 3 has a fan shape, divergent beams of other shapes (e.g., cone, elliptical) can be employed. The divergent beam 317 can be scanned in a back and forth (see arrow in FIG. 3) pattern or rotated about an axis. When the beam illuminates a target, a relatively strong reflected light will be detected by the PCU 310. Several sequential distance readings collected as the divergent beam sweeps over the target can be averaged to improve accuracy. Because the PCU 310 includes a single LDM, the targets A and B may include features to distinguish them from one another as discussed with reference to FIG. 2.

Use of a divergent beam with retro reflective targets in distance based position measuring provides some advantages as compared to a collimated beam relying on diffuse reflection from surfaces such as walls to determine distance. When a divergent beam is used with selective retro reflective targets like the one shown in FIG. 2, the PCU can more easily distinguish the targets and determine the distance between the PCU and the targets. This is because the light reflected back from the target will be markedly stronger than the light diffusely reflected back from surrounding surfaces. The reflectivity of the targets can be made very high and consistent compared to the uncontrolled reflectivity of construction materials. When illuminated by a divergent beam, the distance value from a small target will be more distinctive than the distance value from a larger surface such as a wall.

FIG. 3A illustrates an LDM 313' that emits a static wide static divergent beam 317'. The beam 317' emitted by the LDM 313' may have, for example, a horizontal divergence angle $\theta_H$ of 80 degrees and a vertical divergence angle $\theta_V$ of 30 degrees. Either the thin scanning laser beam 317 of FIG. 3 or the wide divergent laser beam 317' of FIG. 3A can be used in the various embodiments described herein.

Figure 4:
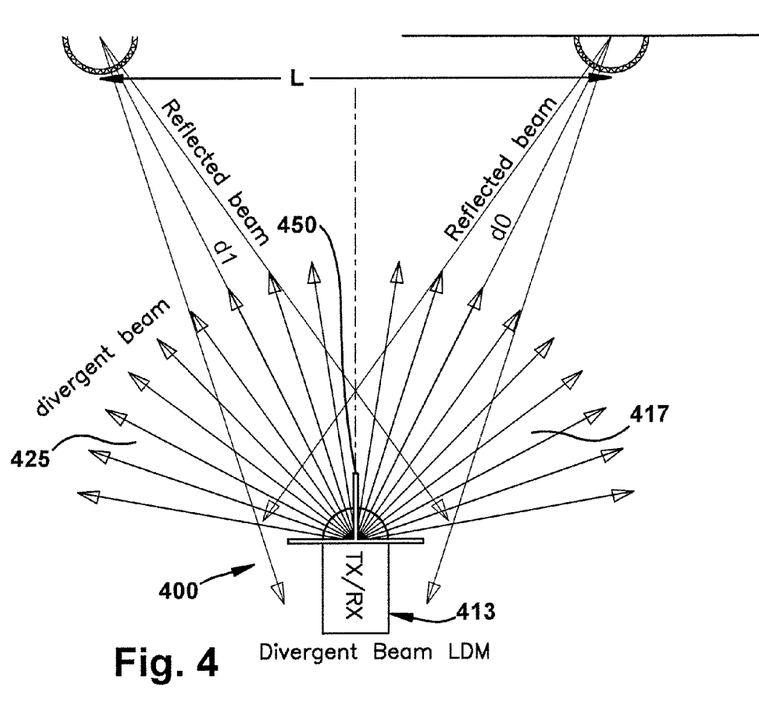
FIG. 4 is a schematic illustration of an example embodiment of a distance based measuring system that employs a pointing reference.

FIG. 4 schematically illustrates an example embodiment of an LDM assembly 413 that includes two LDMs, each of which emits a (either thin scanning or wide static) divergent beam, 417, 425. The divergent beams 417, 425 have a divergence pattern illustrated in FIG. 4. The divergence angles are not limited to the thin or wide examples discussed, but can be selected to best reduce the amount of searching an operator must do to acquire measurements $d_0$ and $d_1$ from the targets with the beam(s) and to provide continuous position calculation for small movements of the PCU (110, FIG. 1).

It may be desirable to make the pattern of the divergent laser beam(s) apparent to the user. A pointing reference 450 can be positioned between the beams emitted by the two LDMs in the LDM assembly 413. The user can point the pointing reference 450 between the targets. The pointing reference 450 may also block light reflected from one target from being collected by the LDM associated with the other target. This will eliminate any need to distinguish between the different targets. If cross talk between the light reflected from the different targets remains an issue, each quadrant could be illuminated and read alternately.

The first and second targets (A and B) described above have been shown at the same height (H) for the purposes of this description. The targets may also be located at different heights and accounted for separately in the equation derivations.

The distance based measurement systems described above can be used to determine a three dimensional position of a feature of interest. A third target (not shown) also having a known location is used. The PCU calculates the three dimensional position using trilateration with the distances between the LDM and the three targets. In the coordinate system illustrated in FIGS. 1 and 3, $z_i$ would equal h. For improved accuracy, the third target should be at a substantially different location on the z axis than the other two targets.

In applications where the PCU is allowed to move to the opposite side of the WALL (FIGS. 1 and 3) the addition of another target would allow disambiguation of the $y_i$ coordinate polarity. The addition of more targets would allow the system to continue working even when some of the targets are obscured. To save setup effort, the relative locations of the additional targets could be automatically be determined and saved for later use while the system is in operation using the first two targets.

Figure 5:
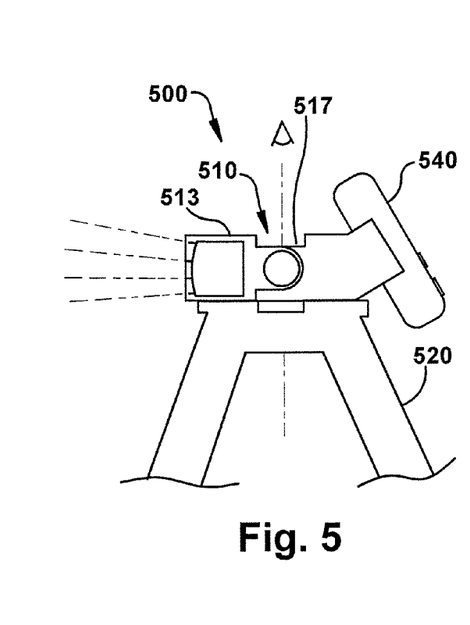
FIG. 5 is a schematic illustration of an example embodiment of a two dimensional distance based measuring system.

FIG. 5 illustrates an example embodiment of a two dimensional distance based measuring system 500. The system 500 includes a PCU 510 mounted to a rolling tripod 520. The PCU 510 includes an LDM assembly 513 that emits a divergent beam. The alignment sight 517 (see sight 117 in FIG. 1A) is indicated generally as 517. The LDM assembly 513 may be adjusted by pivoting the assembly with respect to the PCU. A level bubble and plummet (not shown) may be included on the PCU 510 to help align the LDM assembly properly with respect to feature of interest. The system 500 also includes a graphical user interface (GUI) unit 540 that displays position information to an operator. The GUI unit 540 may also electronically store a blueprint and allow an operator to survey a location by adding the position information for various features in the electronic version of the blueprint. The GUI unit 540 may store the position information. The GUI may allow the user to layout features of interest by entering the coordinates for the features of interest. The GUI may allow the user to perform mathematical functions on feature coordinates (e.g., min, max, average, sum, difference, angle, slope, curve fit, area, volume, and so on).

Figure 6:
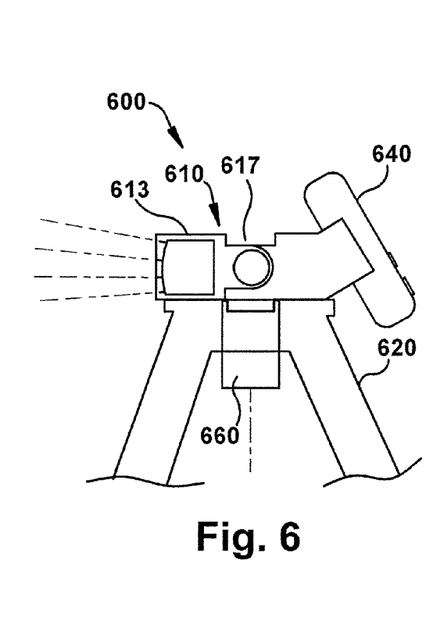
FIG. 6 is a schematic illustration of an example embodiment of a two dimensional distance based measuring system that includes a plumb oriented laser distance meter feature.

FIG. 6 illustrates an example embodiment of a distance based measuring system 600. The system 600 includes a PCU 610 mounted to a rolling tripod 620. The PCU 610 includes an LDM assembly 613 that emits a divergent beam. The system 600 also includes a vertical LDM 660 mounted below the PCU 610. The vertical LDM 660 is used to align the LDM assembly 613 with the feature of interest and also to determine the height of the PCU 610 with respect to the feature of interest on the reference plane. The vertical LDM 660 continuously determines the dimension h, allowing the user to change dimension h as desired and have the changes automatically communicated to the trilateration unit 640. Changes to the dimension h may be encountered if the PCU is hand held or if the line of sight from the PCU 610 to the targets is obstructed and can be cleared by moving the PCU vertically.

Figure 7:
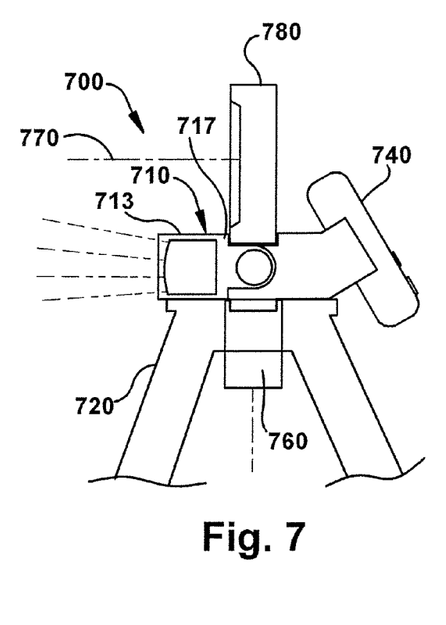
FIG. 7 is a schematic illustration of an example embodiment of a three dimensional distance based measuring system that utilizes a reference laser plane and a laser plane detector.

FIG. 7 illustrates an example embodiment of a three dimensional distance based position measuring system 700. The system 700 includes a PCU 710 mounted to a rolling tripod 720. The PCU 710 includes an LDM assembly 713 that emits a divergent beam. The system 700 also includes a vertical LDM 760 mounted below the PCU 710. The vertical LDM 760 is used to align the LDM assembly 713 with the feature of interest using sight and also to determine the height of the PCU with respect to the feature of interest.

To determine the position of a feature of interest in two or three dimensions, the system 700 also includes a laser transmitter that emits a laser plane 770 that establishes a reference plane. Laser plane 770 is used as the reference plane instead of the floor to allow accurate operation on sites with uneven or unsuitable floors. To determine the three dimensional position of the feature of interest, the PCU collects distance information from the LDM assembly 713 and a laser plane detector 780 to determine x and y coordinates. The PCU 710 uses the height information from the vertical LDM 760 and the laser plane detector 780 to determine the z coordinate of the feature of interest.

Figure 8:
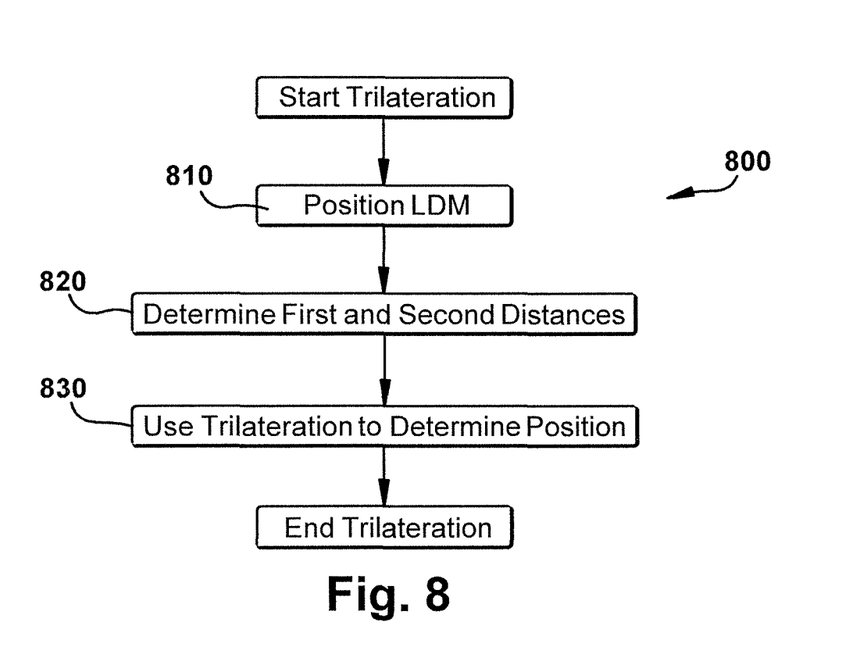
FIG. 8 is a flowchart illustrating an example embodiment of a method for operating a distance based measuring system.

FIG. 8 illustrates an example embodiment of a method 800 for determining a position of a feature of interest. At 810 the method includes positioning an LDM in a selected position (e.g., proximate a feature of interest). At 820 first and second distances between the LDM and first and second targets, respectively, are determined. The first and second targets have known positions in three dimensions with respect to a reference plane on which the LDM is located. At 830 the method includes computing a two dimensional position of the LDM (e.g., the feature of interest) relative to the first and second targets based, at least in part, on the first and second distances.

Figure 9:
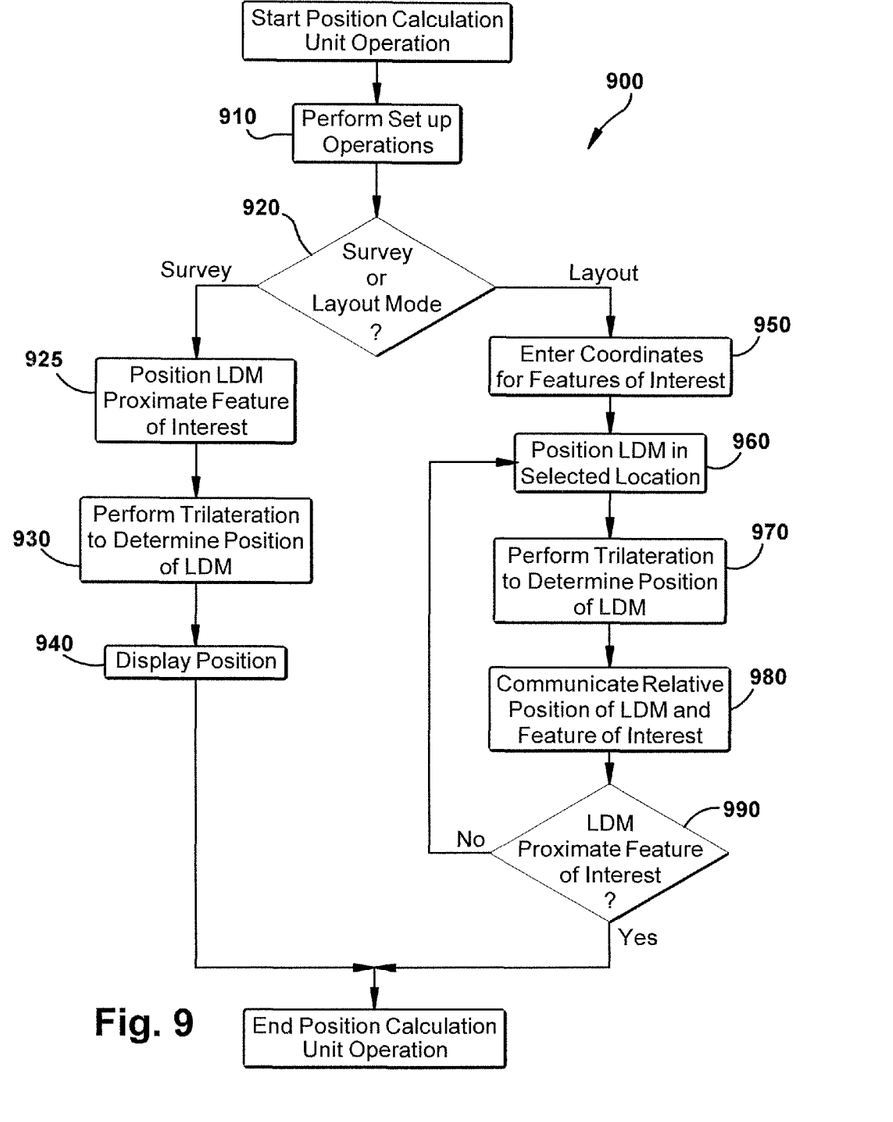
FIG. 9 is a flowchart illustrating an example embodiment of a method for operating a distance based measuring system.

FIG. 9 illustrates on example embodiment of a method 900 of operating a position calculation unit. At 910 the method includes performing set up operations. Set up operations include attaching targets to the walls, measuring the height of the targets, the distance between the targets, and the height of the PCU. The height of the targets and PCU and the distance between the targets are input into the PCU for use in position calculations. Any transformation between coordinate systems may be performed at this point if desired.

At 920, a mode of operation is selected. At 925 if survey mode was selected, the LDM is positioned proximate a feature of interest. This may be performed by using an alignment feature such as a sight and reticule to align the LDM with a feature of interest. At 930 trilateration is performed (see method 800) to determine the position of the LDM. At 940 the position of the LDM/feature of interest is displayed and the method ends.

At 950 if layout mode was selected coordinates of a feature of interest are entered into the PCU. At 960 the PCU is positioned in a selected location and at 970 trilateration is performed to determine the position of the LDM. The position of the LDM relative to the feature of interest is communicated to the user. For example, the relative positions of the LDM and the feature of interest can be displayed on a map-like display as the user moves through the site. At 990, a determination is made as to whether the LDM is proximate (within a threshold distance) to the feature of interest. If the LDM is proximate the feature of interest, the method ends. If the LDM is not proximate the feature of interest, the method repeats at 960 and a new LDM position is determined.

The following includes definitions of selected terms employed herein. The definitions include various examples and/or forms of components that fall within the scope of a term and that may be used for implementation. The examples are not intended to be limiting. Both singular and plural forms of terms may be within the definitions.

Various components (e.g., the PCU and GUI unit) of the described invention can be implemented in a computing device. The computing device can be a computer that includes a processor, a memory, and input/output ports operably connected by a bus. In one example, the PCU can be implemented in a logical unit that is configured to perform trilateration to determine a position. The logical unit may be implemented in hardware, firmware, or an ASIC programmed to perform trilateration. The logical unit may be implemented as computer-excutable instructions stored on non-transitory computer-readable medium that, when executed, cause a computer to determine a position using trilateration.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. An apparatus comprising:
 first and second targets each comprising a retro reflector arrays;
 a laser distance meter (LDM) configured to emit a laser beam and to determine first and second distances between the LDM and the first and second targets, respectively, such that the targets reflect the laser beam back to the LDM, wherein the first and second targets have known positions in three dimensions with respect to a reference plane relative to which the LDM is located;
 a trilateration unit configured to compute a two dimensional position of the LDM relative to the targets based, at least in part, on the first and second distances; and
 where the first and second targets are configured to intermittently shield the retro reflector arrays from the laser beam.

2. The apparatus of claim 1 where the first and second targets comprise barcodes that encode identifying information for the targets.

3. The apparatus of claim 1 where the LDM determines a third distance between the LDM and a third target having a known position with respect to the reference plane and further where the trilateration unit computes a three dimensional position of the LDM relative to the targets based, at least in part, on the first, second, and third distances.

4. The apparatus of claim 1 where the LDM is configured to emit a wide divergent laser beam.

5. The apparatus of claim 1 where the LDM is configured to emit a thin scanning laser beam.

6. The apparatus of claim 1 further comprising a laser plane emitter configured to emit the reference plane.

7. A method comprising:
 emitting, with a laser plane emitter, a reference plane;
 positioning an LDM proximate to a feature of interest and at a known position with respect to the reference plane;
 determining first and second distances between the LDM and first and second targets, respectively, the first and second targets having known positions in three dimensions with respect to the reference plane; and
 computing a two dimensional position of the LDM relative to the first and second targets based, at least in part, on the first and second distances.

8. The method of claim 7 comprising computing the position by:
 computing x axis position component and a y axis position component using the following formulas:

$$x_i = (d_1^2 + L^2 - d_0^2) 2L$$

$$y_i = (d_1^2 - (H-h)^2 - x_i^2)^{1/2}$$

where:
 $d_0$ = the first distance;
 $d_1$ = the second distance;
 L = distance between the targets;
 h = height of the LDM relative to the reference plane; and
 H = the height of the first and second target relative to the reference plane.

9. The method of claim 7 comprising emitting a divergent beam with the LDM and determining the first and second distances based on a property of light reflected back from the first and second targets to the LDM.

10. The method of claim 9 comprising filtering light reflected back to the LDM with a polarizing filter to determine if the light was reflected from a target.

11. The method of claim 9 comprising emitting the divergent beam in a scanning pattern until light is reflected back from a target.

12. The method of claim 7 comprising mounting the first and second targets and determining their position with respect to one another and the reference plane.

13. The method of claim 7 comprising determining a third distance between the LDM and the reference plane.

14. The method of claim 7 comprising determining a third distance between the LDM and a third target having a known position with respect to the reference plane and computing a three dimensional position of the LDM relative to the targets based, at least in part, on the first, second, and third distances.

15. A position measuring system comprising:
  first and second reflective targets configured to reflect light from a laser beam; and
  a position calculation unit configured to be positioned proximate a feature of interest, the position calculation unit comprising:
    a sight through which the feature of interest is visible when the position calculation unit is aligned with the feature of interest;
    an LDM configured to emit a laser beam and to determine first and second distances between the first and second targets based on a property of light reflected back from the first and second targets, wherein the first and second targets have known positions in three dimensions with respect to the reference plane;
    a trilateration unit configured to compute a two dimensional position of the LDM relative to the targets based, at least in part, on the first and second distances; and
    a graphical user interface unit configured to display the two dimensional position of the LDM as the survey unit is moved on the reference plane.

16. The position measuring system of claim 15, wherein the position calculation unit further comprises laser transmitter configured to emit the reference plane and an associated laser detector configured to determine a height of the LDM with respect to the reference plane.

17. An apparatus comprising:
  first and second reflective targets;
  a laser distance meter (LDM) configured to emit a laser beam and to determine first and second distances between the LDM and the first and second reflective targets, respectively, such that the targets reflect the laser beam back to the LDM, wherein the first and second targets have known positions in three dimensions with respect to a reference plane relative to which the LDM is located;
  a trilateration unit configured to compute a two dimensional position of the LDM relative to the targets based, at least in part, on the first and second distances; and
  where the LDM comprises a circular polarizer that acts on the laser beam to produce circular polarized light having a selected hand orientation and where the first and second targets comprise a quarter wave retarder film that acts on a reflected laser beam emitted by the targets to produce circular polarized light having the selected hand orientation.

18. The apparatus of claim 17 where the LDM determines a third distance between the LDM and a third target having a known position with respect to the reference plane and further where the trilateration unit computes a three dimensional position of the LDM relative to the targets based, at least in part, on the first, second, and third distances.

19. The apparatus of claim 17 where the LDM is configured to emit a wide divergent laser beam.

20. The apparatus of claim 17 where the LDM is configured to emit a thin scanning laser beam.

21. The apparatus of claim 17 further comprising a laser plane emitter configured to emit the reference plane.

* * * * *